United States Patent

Sidorov et al.

[15] 3,675,102

[45] July 4, 1972

[54] DYNAMO-ELECTRIC MACHINE

[72] Inventors: Oleg Pavlovich Sidorov, ulitsa Golyanova, korpus 202, kv. 8; Pavel Sergeevich Ryabtsev, Mukomolny proezd, 15, korpus 2, kv. 8, both of Moscow; Rostislav Ivanovich Lastochkin, deceased, late of Moscow, U.S.S.R. by Nadezhda Andreevna Lastochkina and Tatyana Rostislavovna Lastochkina, administrators, both of Scherbakovskaya ulitsa, 40/42, Kr. 50

[22] Filed: Nov. 18, 1970

[21] Appl. No.: 90,522

[52] U.S. Cl. .................................. 310/266, 310/67, 310/90
[51] Int. Cl. ........................................................... H02k 1/22
[58] Field of Search ................... 310/266, 67, 264, 265, 177, 310/90

[56] References Cited

UNITED STATES PATENTS

| | | | |
|---|---|---|---|
| 3,312,846 | 4/1967 | Henry-Baudot | 310/266 |
| 3,484,635 | 12/1969 | MacKallor | 310/266 |
| 3,441,757 | 4/1969 | Erickson | 310/62 |
| 3,290,528 | 12/1966 | Adler | 310/266 |
| 3,532,916 | 10/1970 | Fisher | 310/266 |

*Primary Examiner*—J. D. Miller
*Assistant Examiner*—R. Skudy
*Attorney*—Holman & Stern

[57] ABSTRACT

A dynamo-electric machine, in particular a direct-current electric machine in which a rotatable hollow armature with windings arranged thereon is placed into an air gap between an armature core and pole pieces, with one end of said hollow armature being secured to a shaft of the machine and the other end thereof being provided with a support which is used for centering the armature.

2 Claims, 4 Drawing Figures

DYNAMO-ELECTRIC MACHINE

BACKGROUND OF THE INVENTION

The present invention relates to dynamoelectric machines and more particularly has reference to direct-current electric machines.

Commonly known in the art are direct-current electric machines having a hollow armature which is provided with windings arranged thereon and which at one end is mounted on a shaft of the machine, with said armature being disposed in an air gap between an armature core and poles of the machine. Also known in the art are cantilever and non-cantilever type mountings of the armature in these machines.

The known electric machines with non-cantilever type mounting of the armature are disadvantageous in that the armature core is mounted on its own bearings which can not be serviced and this fact considerably reduces the life of the machine. In addition, in the transient operating conditions, the armature core can shift and this deteriorates the dynamic characteristics of the electric machine.

The cantilever-type mounting of the hollow armature is associated with difficulties in setting the armature of a sufficient length in the air gap and this limits the application of the electric machines with an elongated armature, and therefore, in this case it is not possible to make a high-power electric machine of such a type.

An object of the present invention is to eliminate the above mentioned disadvantages.

SUMMARY OF THE INVENTION

The main object of the invention is to provide a high-power direct-current electric machine having high dynamic and weight characteristics and with an increased service life due by virtue of an accurate setting of the armature in the air gap along the whole length thereof.

This object is accomplished by providing a direct-current electric machine with a hollow rotatable armature, which has windings and at one end is mounted on a shaft of the machine within an air gap between a stationary armature core and pieces, wherein, according to the invention, the hollow armature at its other end is provided with a support centering the armature.

The support is preferably mounted inside the hollow armature, while the shaft of the machine is preferably made hollow.

In the present direct-current electric machine, there is provided a complete centering of the hollow armature within the air gap between the pole pieces, whereby it is possible to make the hollow armature sufficiently long and to make the machine itself as a high-powered unit.

Other objects and advantages of the invention will be apparent from the following detailed description of an embodiment by way of example, reference being made to the accompanying drawings, in which:

DETAILED DESCRIPTION OF THE DRAWINGS

Figure 1:
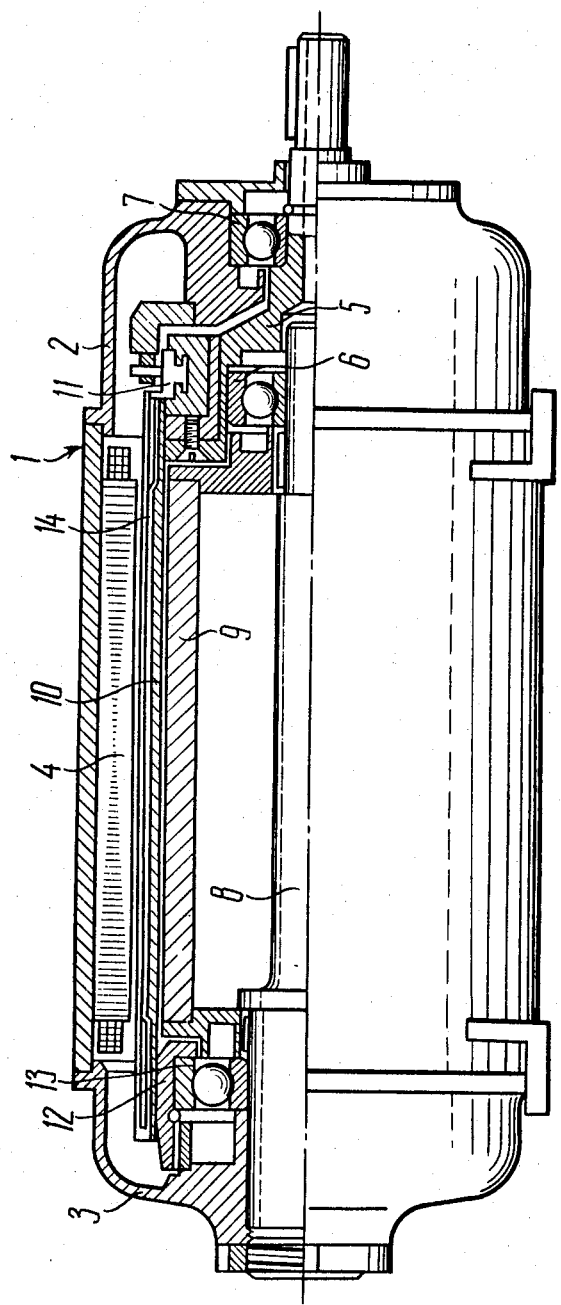
FIG. 1 is general general sectional view of the proposed direct-current electric machine according to the invention.

The direct-current electric machine (FIGS. 1 and 2) comprises a housing 1 provided with shields 2 and 3, and with pole pieces 4 being mounted within the same housing 1. Mounted in the shield 2 is a hollow shaft 5 which is disposed between two bearings 6 and 7, whereas secured in the shield 3 is a stationary cylindrical member 8 on which there is mounted a armature core 9. Provided between the pole pieces 4 and the armature core is an air gap in which is disposed a hollow armature 10. At one end of the hollow armature 10 is disposed a commutator 11 mounted on the hollow shaft 5 and the other end of the armature 10 has a fitting surface providing for setting a support 12. The support 12 through a bearing 13 mounted on the member 8 centers the hollow armature 10. In this case, the axis of the stationary cylindrical member 8 should coincide with the axis of the hollow shaft 5.

Arranged on the hollow armature 10 is a winding which may consist of winding wires or be made as a printed circuit. The hollow armature 10 may be made in the form of a thin cylinder of an insulating material, on which there is laid and secured a winding 14. The winding 14 may be accomplished on a temporary support which is dissloved or mechanically removed after setting the winding 14 with a compound.

The hollow armature 10 may be provided with a tachometric winding which is led to a separate commutator or to slip rings.

In order to increase the accuracy of setting the hollow armature 10 (FIG. 3), the bearing 13 may be installed above the bearing 7, in which case the cylindral member may be merged with the armature core, while the free end of the shaft is led out on the side opposite to the commutator 11. In this construction of the machine the pole pieces 15 are made of permanent magnets while the armature core 16 is located within the hollow armature 10. In other respects the electric machine of this construction is similar to the machine described above.

Figure 2:
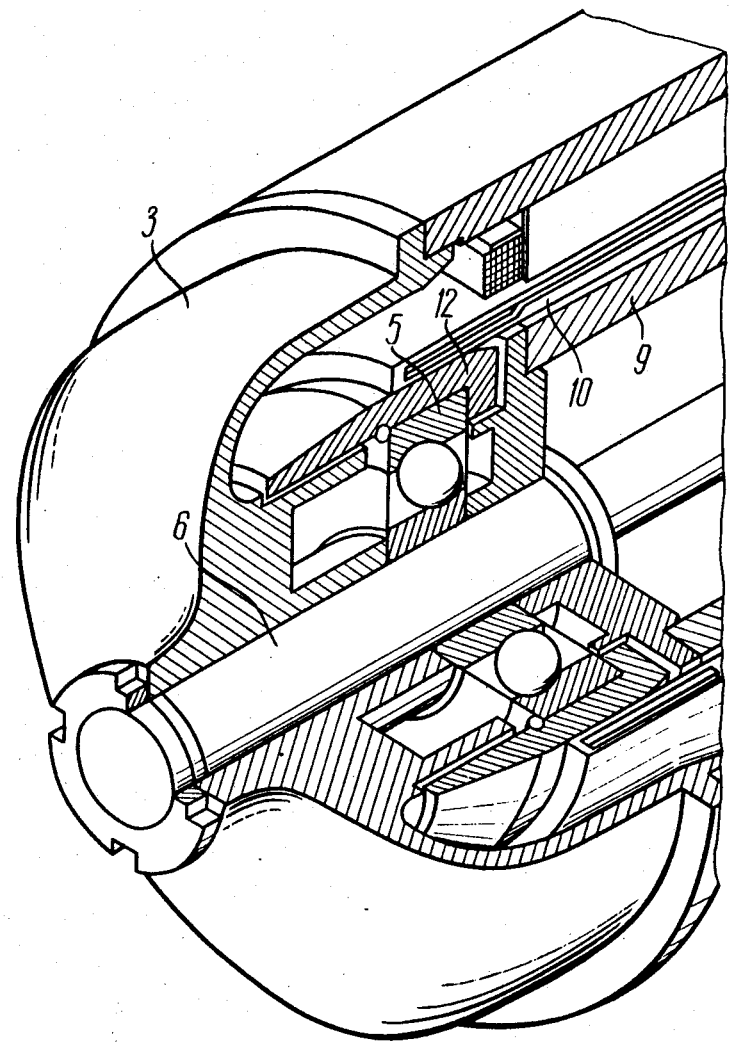
FIG. 2 is an isometric view of the mounting of the hollow armature according to the invention.
Figure 3:
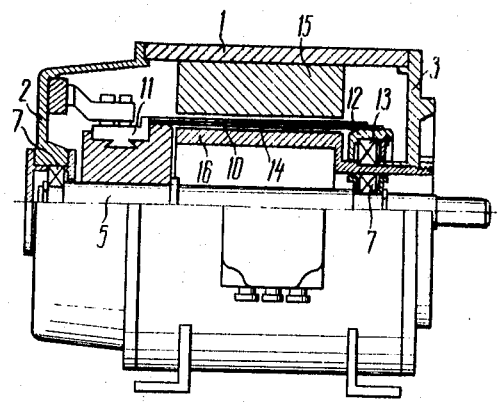
FIGS. 3, 4 show various constructive modifications of the electric machine embodying the invention.
Figure 4:
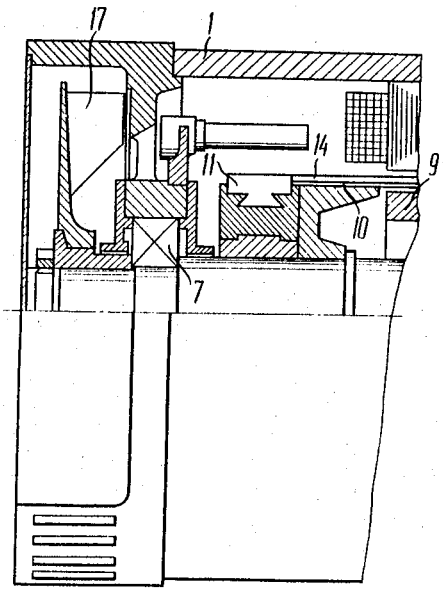

The electric machines shown in FIGS. 1, 2, 3 are closed. On making the electric machines with a protective casing (FIG. 4), it is necessary to provide cooling of the field windings of the poles and the windings 14 of the armature 10, for which purpose a fan means 17 is mounted in the housing 1.

The principle of operation of the electric machine shown in FIGS. 1, 2, 3 and 4 is similar to that of conventional direct-current machines.

We claim:

1 - In a dynamo-electric machine of the type including a stator-housing having at least two end shields, a hollow shaft mounted in one of the shields, bearings centering the hollow shaft in said one shield, a stationary cylindrical member secured in the other shield, with poles having pole pieces, a cylindrical armature-core mounted on said cylindrical member, and a hollow armature around the armature core with windings disposed thereon and arranged in an air gap between the pole pieces and the armature core, said hollow armature having opposite ends, one end of said armature being secured on said shaft, a bearing secured on said cylindrical member, a support centering the opposite end of the hollow armature and said support being mounted in said last named bearing.

2. The dynamo-electric machine as claimed in claim 1, in which ventilating fan means mounted on the shaft is provided in said one end shield.

* * * * *